US012806692B2

(12) United States Patent
Bjormander et al.

(10) Patent No.: US 12,806,692 B2
(45) Date of Patent: Nov. 24, 2026

(54) CUTTING INSERT WITH SENSOR ARRANGEMENT AND METHOD FOR MANUFACTURING A CUTTING INSERT

(71) Applicant: SANDVIK INTELLECTUAL PROPERTY AB, Sandviken (SE)

(72) Inventors: Carl Bjormander, Stockholm (SE); Conny Lundgren, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 336 days.

(21) Appl. No.: 18/378,228

(22) Filed: Oct. 10, 2023

(65) Prior Publication Data

US 2024/0033830 A1 Feb. 1, 2024

Related U.S. Application Data

(62) Division of application No. 16/652,854, filed as application No. PCT/EP2018/076911 on Oct. 3, 2018.

(30) Foreign Application Priority Data

Oct. 6, 2017 (EP) .................................... 17195198

(51) Int. Cl.
*B23B 27/14* (2006.01)

(52) U.S. Cl.
CPC ...... *B23B 27/141* (2013.01); *B23B 2200/086* (2013.01); *B23B 2260/128* (2013.01); *B23B 2260/144* (2013.01)

(58) Field of Classification Search
CPC ........ B23B 2260/128; B23B 2260/144; B23B 27/148; B23B 27/141; B23B 2270/48;
(Continued)

(56) References Cited

U.S. PATENT DOCUMENTS 4,744,241 A * 5/1988 Mayer .................... B23Q 17/09
409/187
4,885,530 A * 12/1989 Mayer ................ B23Q 17/0928
73/104

(Continued)

FOREIGN PATENT DOCUMENTS

CN 103560204 A * 2/2014
CN 105458312 A 4/2016

(Continued)

*Primary Examiner* — Ryan Rufo
(74) *Attorney, Agent, or Firm* — Corinne R. Gorski

(57) ABSTRACT

A cutting insert for cutting, milling or drilling of metal includes a body having an elongate recess extending along at least a portion of the body, a first layer covering interior side walls of the recess, and a sensor arrangement. The body includes a substrate. The sensor arrangement includes sa lead extending along the recess. The lead includes electrically conductive material, which is arranged in the recess such that the first layer is located between the electrically conductive material and the substrate. For at least a depth below which at least a portion of the electrically conductive material is arranged in the recess, a width of the recess measured at that depth between portions of the first layer covering opposite interior side walls of the recess is less than or equal to 80 micrometers.

11 Claims, 6 Drawing Sheets

(58) Field of Classification Search
CPC .......... B23B 2270/022; B23B 2270/32; B23Q 17/0995; B23Q 17/09; B23C 2260/76
See application file for complete search history.

(56) References Cited

U.S. PATENT DOCUMENTS 4,927,300 A * 5/1990 Ramalingam ...... B23Q 17/0957 407/120
4,945,770 A * 8/1990 Alvelid .............. B23Q 17/0957 374/E1.019
5,176,053 A * 1/1993 Alvelid ................. B23B 27/145 73/104
5,573,335 A * 11/1996 Schinazi .................. G01K 7/04 73/104
6,456,054 B1 * 9/2002 Kataoka ................ B23B 27/145 73/104
6,471,449 B1 * 10/2002 Kataoka ................ B23B 27/141 407/120
6,526,814 B1 * 3/2003 Kataoka ................... G01N 3/58 73/104
6,592,303 B2 * 7/2003 Kataoka ................... G01N 3/58 407/113
8,132,467 B2 * 3/2012 Shinde ..................... G01N 3/56 73/774
8,564,449 B2 * 10/2013 Mitchell ................ G01N 3/066 73/146
10,598,579 B2 * 3/2020 Kalhori .................... G01N 3/58
2004/0202886 A1 10/2004 Subramanian
2010/0255345 A1 10/2010 Ban et al.
2011/0169651 A1 7/2011 Mitchell et al.

FOREIGN PATENT DOCUMENTS

DE 3535473 A1 * 4/1987
DE 10220755 A1 * 11/2002 ........... B23B 27/145
DE 10227677 A1 * 2/2003 ............... B23C 5/00
EP 1186365 A1 * 3/2002 ......... B23B 27/1625
EP 2637014 A1 9/2013
EP 3106260 A1 12/2016
GB 2577077 A * 3/2020 ............. B23B 27/00
JP 2003191105 A 12/2001
JP 40024407 B2 10/2007
JP 2012020359 A * 2/2012

* cited by examiner

CUTTING INSERT WITH SENSOR ARRANGEMENT AND METHOD FOR MANUFACTURING A CUTTING INSERT

RELATED APPLICATION DATA

This application is a divisional of U.S. patent application Ser. No. 16/652,854 filed Apr. 1, 2020, which is a § 371 National Stage Application of PCT International Application No. PCT/EP2018/076911 filed Oct. 3, 2018 claiming priority to EP 17195198.1 filed Oct. 6, 2017.

TECHNICAL FIELD

The present disclosure generally relates to the field of cutting inserts for turning, milling or drilling of metal. The present disclosure also relates to methods of manufacturing such cutting inserts.

BACKGROUND

Cutting inserts may, for example, be employed in machining operations such as cutting, milling or drilling of metal. Different geometries, materials and coatings have been proposed for improving performance of cutting inserts (for example, improving the overall durability of the cutting insert, or improving the ability of the cutting insert to withstand heat). In addition to providing cutting inserts with good performance, it is also desirable to be able to manufacture the cutting inserts in a cost-efficient way (for example, using a manufacturing method that does not take too much time and/or which does not involve many complicated steps).

In machining with replaceable cutting inserts (such as cutting, milling or drilling of metal), there has been an increased interest in different ways to monitor or measure conditions at the cutting insert during operation, since such conditions may affect performance of the machining. Decisions regarding altering of operation parameters, exchange of cutting insert or repositioning of the cutting insert in its holder can be taken based on measurements of the condition of the cutting insert itself and/or based on conditions to which the cutting insert is being subjected during operation. Due to such measurements, time-consuming manual inspection of the condition of the cutting insert may be avoided, whereby efficiency may be improved and/or a more automated operation may be obtained. Precise measurements/monitoring of the condition of the cutting insert, and correct actions performed at the right time as a consequence thereof, may help to prevent damaging of the work piece due to use of excessively worn cutting inserts or operation of the cutting insert at unfavorable operating conditions (such as operating with large vibrations or at too high temperatures). For actions performed in response to measurements to achieve the desired effect, it is important that the measurements are reliable.

JP2003191105A describes a cutting tool provided with a sensor circuit for detecting wear of a cutting edge. The sensor circuit is designed to be stable in the sense that it does not easily peel off or get disconnected. A conductor of the sensor circuit is arranged in a recess formed at the surface of a base material. The width of the recess may be 0.1 to 5 millimeters. The ability of the conductor to conduct electrical current is monitored to detect wear of the cutting edge. The base material may be made of an electrically conductive material, and an insulating film may be interposed between the base material and the conductor. A hard coating layer may be disposed on the surface of the sensor circuit for protecting the sensor circuit.

However, it would be desirable to provide new cutting inserts for addressing at least one of the abovementioned issues.

SUMMARY

It is an object of the present disclosure to provide cutting inserts, as well as methods of manufacturing such cutting inserts, for addressing at least one of the abovementioned issues.

Hence, according to a first aspect, there is provided a cutting insert for cutting, milling or drilling of metal. The cutting insert includes a body, a first layer, and a sensor arrangement. The body includes a substrate (or base material). The body has an elongate recess (or cavity) extending along at least a portion of the body. The first layer covers interior side walls of the recess. The sensor arrangement includes a lead extending along the recess. The lead includes electrically conductive material which is arranged in the recess such that the first layer is located between the electrically conductive material and the substrate. For at least a depth below which at least a portion of the electrically conductive material is arranged in the recess, a width of the recess measured at that depth between portions of the first layer covering opposite interior side walls of the recess is less than or equal to 80 micrometers. In other words, the width is defined (or measured) across the recess between a portion of the first layer covering a first side wall of the recess and another portion of the first layer covering a side wall of the recess opposite to the first side wall, and the width is defined (or measured) at a depth below which at least a portion of the electrically conductive material is arranged (hence, at least some of the electrically conductive material is located deeper into the recess than where the width is defined/measured).

The width may, for example, be less than or equal to 75 micrometers, or less than or equal to 70 micrometers, or less than or equal to 65 micrometers, or less than or equal to 60 micrometers, or less than or equal to 50 micrometers.

Measurements at the cutting insert may, for example, be employed to make decisions regarding operation parameters, exchange of cutting insert, or repositioning of the cutting insert. Such measurements may, for example, be performed via the sensor arrangement.

While a lead placed at (or close to) the surface of a cutting insert may be susceptible to damage, placement of the lead in the recess may provide the lead with at least some degree of protection from damage. Due to the recess, the risk that the lead falls off or gets broken already at an initial stage of machining may be reduced, so that the lead may be employed to make measurements for a longer time than if placed at the surface of the cutting insert. In other words, the placement of the lead in the recess may improve the lifetime of the sensor arrangement and/or the reliability of measurements performed via the sensor arrangement.

While a lead placed at (or close to) the surface of a cutting insert may be susceptible to accidental short circuits (or unintended electrical connections) caused by chips or debris created during interaction of the cutting insert with a work piece, placement of the lead in the recess may provide the lead with at least some degree of protection from such short circuits or other interference which could affect measurements. This may improve reliability of measurements performed via the sensor arrangement.

Cutting inserts may be post treated using blasting for providing a desired surface smoothness and/or for enabling a tougher edge line performance due to the resulting residual compressive stress as a result of the blasting. Blasting may involve bombarding a surface by particles. The size of particles employed during blasting is often limited (for example, the average diameter of the particles may be below a certain value/threshold) since the kinetic energy of large particles may cause damage to the cutting edge of the cutting insert. Using small blasting particles may, for example, allow better control of the blasting process than using large blasting particles. Placing the lead in a too broad/wide recess may allow blasting particles to enter the recess and to damage the lead (or even remove the lead completely), while a sufficiently narrow recess may protect the lead during blasting. As an example, JP2003191105A describes use of a recess which may be several millimeters wide. If such a wide recess was to be subjected to blasting, the lead in the recess would be damaged (or removed) unless the blasting particles were several millimeters in diameter or unless the lead was covered by some kind of protective coating prior to the blasting. Use of a narrower recess than in JP2003191105A allows the lead to be better protected during blasting, and it is therefore possible to use smaller blasting particles than for the cutting insert in JP2003191105A.

In the cutting insert according to the first aspect, the first layer may, for example, be more resistant to blasting than the electrically conductive material of the lead. If the cutting insert is subjected to blasting, a width of the recess as experienced by the blasting particles may, for example, be less than or equal to 80 micrometers due to the ability of the first layer to withstand blasting. During manufacture of the cutting insert, portions of the electrically conductive material located outside the recess may, for example, be removed via blasting, while portions of the first layer located outside the recess may withstand (or remain undamaged by) the blasting.

The sensor arrangement may, for example, be arranged (or suitable) for performing measurements. Measurements performed via the sensor arrangement may, for example, include measuring a resistance of a circuit including the lead. Measurements performed via the sensor arrangement may, for example, be adapted (or suitable) for detecting wear of the cutting insert. In other words, the sensor arrangement may, for example, be arranged (or suitable) for detecting wear of the cutting insert.

It will be appreciated that the cutting insert need not necessarily comprise all circuitry necessary to perform measurements. External circuitry may, for example, be connectable to the sensor arrangement for performing the measurements using the sensor arrangement.

The recess may, for example, extend along one or more exterior surfaces of the body, for example, along one or more exterior surfaces of the substrate.

The body may, for example, include one or more layers. The recess may, for example, be formed in one or more of such layers.

The width of the recess may, for example, be measured (or defined) in a direction transverse to (or orthogonal to) the extension of the recess. In other words, the recess may, for example, extend in a longitudinal direction, and the width may, for example, be measured in a direction transverse to (or orthogonal to) the longitudinal direction. The width of the recess may, for example, be measured (or defined) in a direction which is substantially parallel to a face (or surface) of the body at which the recess is formed.

It will be appreciated that the recess could for example be relatively wide (for example wider than 80 micrometers) at the top close to the surface level of the body, but may be more narrow deeper down into the recess below the surface level of the body.

It will be appreciated that the cutting insert may optionally include one or more additional layers, for example arranged between the substrate and the first layer, and/or between the first layer and the lead.

According to some embodiments, the recess may be formed in the substrate. The base and the substrate coincide. The first layer may, for example, cover at least a portion of the substrate.

According to some embodiments, the body may include the first layer, and the recess may be formed in the first layer. The material of the first layer may, for example, be more homogeneous than the material of the substrate, so it may be easier to form the recess in the first layer than in the substrate.

According to some embodiments, for each depth at which at least a portion of the electrically conductive material is arranged in the recess, a width of the recess measured at that depth between portions of the first layer covering opposite interior side walls of the recess may be less than or equal to 80 micrometers. In other words, the width may be defined (or measured) at depths where at least a portion of the electrically conductive material is arranged in the recess. The width may, for example, be less than or equal to 75 micrometers, or less than or equal to 70 micrometers, or less than or equal to 65 micrometers, or less than or equal to 60 micrometers, or less than or equal to 50 micrometers.

According to some embodiments, the first layer may be an electrically insulating layer.

If the substrate is electrically conductive, the first layer may, for example, provide electrical insulation between the substrate and the lead. If there is an electrically conductive layer between the substrate and the first layer, the first layer may, for example, provide electrical insulation between that electrically conductive layer and the lead.

According to some embodiments, at least a portion of the lead may be arranged at a depth of the recess such that there is space within the recess above the lead.

The space within the recess above the lead may, for example, reduce the risk that the lead gets into unintentional electrical contact with other leads or electrical conductive layers via chips from a work piece or via debris created during interaction between the cutting insert and a work piece. This may increase the reliability of measurements performed via the sensor arrangement.

The space within the recess above the lead may, for example, be open space (which may, for example, be filled/occupied by air from the surroundings), or may, for example, be at least partially occupied by one or more additional layers.

According to some embodiments, the cutting insert may include a second layer arranged in the recess such that the lead is located between the first layer and the second layer. The second layer may be an electrically insulating layer.

The electrical insulation provided by the second layer may reduce the risk that the lead gets into unintentional electrical contact with other leads or electrical conductive layers via chips from a work piece or via debris created during interaction between the cutting insert and a work piece. This may increase the reliability of measurements performed via the sensor arrangement.

The second layer may prevent (or reduce) oxidation of the lead, which could otherwise affect resistance of the lead.

Reduced oxidation of the lead may, for example, increase the reliability of measurements performed via the sensor arrangement.

According to some embodiments, the first layer may be more resistant to blasting than the second layer. Blasting may, for example, comprise bombarding a surface by particles.

The first layer may, for example, include a material which may withstand (or remain undamaged by) blasting. During manufacture of the cutting insert, portions of the second layer located outside the recess may, for example, be removed via blasting, while portions of the first layer located outside the recess may, for example, withstand (or remain undamaged by) such blasting. The more resistant first layer may, for example, remain outside the recess to serve as a hard (or durable) layer during machining, while the remaining portion(s) of the less resistant second layer may be protected by the recess and may provide electrical insulation for the lead.

According to some embodiments, at least a portion of the lead may be arranged at a depth of at least 5 micrometers into the recess. At least a portion of the lead may, for example, be arranged at a depth of at least 10 micrometers into the recess or at least 20 micrometers into the recess.

Portions of the lead arranged deep into the recess may be better protected by the recess and/or may remain longer during wear of the cutting insert than leads (or portions of leads) arranged less deep into the recess. Having at least a portion of the lead arranged deep into the recess may, for example, allow for reliable measurements to be performed even after the cutting insert has been subjected to considerable wear. If, for example, the sensor arrangement is intended for detecting a certain degree of wear, such a degree of wear may, for example, be detected once a lead arranged at a certain depth into the recess is affected (or damaged, or worn down) by interaction between the cutting insert and a work piece.

According to some embodiments, the recess may be no more than 50 micrometers deep. The recess may, for example, be no more than 40 micrometers deep. If the recess is too deep, this may affect the durability of the cutting insert or affect the durability of a cutting edge of the cutting insert.

According to some embodiments, at least a portion of the recess may be located at a rake face of the cutting insert in an area susceptible to be subjected to crater wear caused by chips removed from a metal work piece during operation of the cutting insert on the metal work piece. The at least a portion of the recess may, for example, be located at most 0.3 millimeters from or at least 0.45 millimeters from a cutting edge defined by an intersection between the rake face and a clearance face of the cutting insert.

According to some embodiments, a cross-section of the lead may have a width of at least 5 micrometers. In other words, an object obtained by taking a cross-section of the lead may include at least two points from the lead located at least 5 micrometers from each other. The cross-section may, for example, be taken in a direction which is transverse (or orthogonal) to the main direction in which the lead extends. If the width of the lead is too small, the lead may, for example, be more likely to break during manufacture of the cutting insert. A too small lead is also more demanding to produce without breakages due to defects in the lead material.

The lead may, for example, extend in a longitudinal direction along the recess, and the cross-section of the lead may, for example, be taken (or formed) in a plane transverse to (or orthogonal to) the longitudinal direction.

According to some embodiments, the lead may include an electrically conductive layer covering at least portions of the interior side walls of the recess. A thickness of the electrically conductive layer may be at most 4 micrometers. The thickness of the electrically conductive layer may, for example, be at most 3 micrometers.

Employing a lead which is thicker than necessary may, for example, require more material than necessary and/or may increase a production time of the cutting insert.

Wear may, for example, be more easily detected if a thin lead is employed instead of a thicker lead, since wear to a thin lead may have a more dramatic impact on the resistance of the lead than wear to a thicker lead.

The thickness of the electrically conductive layer may, for example, be at least 0.2, 0.3 or 0.5 micrometers. If the lead is to thin it may break too easily, for example during manufacture of the cutting insert.

According to some embodiments, the sensor arrangement may include first and second contact regions through which the sensor arrangement is connectable to external measuring circuitry. The lead may be connected to the first and second contact regions.

The external measuring circuitry may, for example, measure an electrical resistance between the first and second contact regions. Increased resistance may, for example, indicate that the lead has been affected (or damaged) by interaction of the cutting insert and a work piece (or chips from the work piece) despite being located in the recess. Increased resistance may therefore indicate that the cutting insert has reached a certain level of wear. Decreased resistance during metal cutting may, for example, indicate that an electrically conductive work piece (or a chip from the work piece) is in contact with the lead despite the fact that the lead is located in the recess. Decreased resistance during metal cutting may therefore indicate that the cutting insert has reached a certain level of wear.

According to some embodiments, the body may have multiple elongate recesses extending at least along respective portions of the body. The first layer may cover interior side walls of the recesses. The sensor arrangement may include first and second contact regions through which the sensor arrangement is connectable to external measuring circuitry. The sensor arrangement may include first and second leads extending along respective recesses of the substrate. Each of the first and second leads may include respective electrically conductive material which is arranged in the respective recess such that the first layer is located between the respective electrically conductive material and the substrate. The first lead may be connected to the first contact region and the second lead may be connected to the second contact region. For at least a depth below which at least a portion of the electrically conductive material of the first or second lead is arranged in a recess of the multiple elongate recesses, a width of the recess measured at that depth between portions of the first layer covering opposite interior side walls of the recess may be less than or equal to 80 micrometers. Each of the first and second leads may present a free end positioned such that, upon a predetermined wear of the cutting insert, the free ends will be connected to each other by the metal work piece or by a chip resulting from operation of the cutting insert on the metal work piece. In other words, if the cutting insert has reached the predetermined wear, then the free ends will be connected to each other during operation of the cutting insert on the metal work piece since the metal work piece or a chip resulting from operation of the cutting insert on the metal work piece will connect the free ends to each other.

The external measuring circuitry may, for example, measure an electrical resistance between the first and second contact regions. Reduced resistance may indicate that the predetermined wear of the cutting insert has been obtained.

According to a second aspect, there is provided a method for manufacturing a cutting insert for cutting, milling or drilling of metal. The method includes providing a body with an elongate recess extending along at least a portion of the body. The body includes a substrate. A first layer covers interior side walls of the recess. The method includes forming a layer of electrically conductive material covering at least a portion of the body such that electrically conductive material is provided in the recess with the first layer being located between the electrically conductive material in the recess and substrate, and subjecting at least a portion of the body to blasting such that electrically conductive material located outside the recess is removed from the body while electrically conductive material remaining in the recess forms a lead extending along the recess. For at least a depth below which at least a portion of the electrically conductive material is arranged in the recess, a width of the recess measured at that depth between portions of the first layer covering opposite interior side walls of the recess is less than or equal to 80 micrometers (or less than or equal to 75 micrometers, or less than or equal to 70 micrometers, or less than or equal to 65 micrometers, or less than or equal to 60 micrometers, or less than or equal to 50 micrometers).

The body may, for example, coincide with the substrate, or may, for example, include one or more layers in addition to the substrate. The recess may, for example, be provided in the substrate and/or in one or more of such layers.

The substrate may, for example, be provided via sintering or hot isostatic pressing.

The elongate recess may, for example, be shaped/formed using a laser. If the recess is formed in the substrate, then the elongate recess may, for example, be shaped/formed via use of an adequately shaped pressing tool when providing (or producing) the substrate.

The first layer and/or the electrically conductive layer may, for example, be formed using chemical vapor deposition (CVD) or physical vapor deposition (PVD).

It will be appreciated that while some electrically conductive material located outside the recess is removed by the blasting, some electrically conductive material located outside the recess may, for example, remain also after the blasting (for example if a protective coating protects it from the blasting). It will also be appreciated that while at least some electrically conductive material located in the recess remains after the blasting, some electrically conductive material in the recess may be removed by the blasting (for example if the recess is wide at the top so that the uppermost electrically conductive material in the recess is removed during blasting while electrically conductive material deeper down in a narrower portion of the recess remains after the blasting).

The blasting may include bombardment of the substrate by particles. The average diameter of particles employed in the blasting may, for example, be at least as large as the above described width of the recess (measured at a certain depth of the recess between portions of the first layer covering opposite interior side walls of the recess). The average diameter of particles employed in the blasting may, for example, be at least 50 micrometers, 60 micrometers, 65 micrometers, 70 micrometers, 75 micrometers, or 80 micrometers, or may be in the range of 40-80 micrometers, or in the range of 50-70 micrometers.

The first layer may, for example, be a layer of $\alpha$-$Al_2O_3$, $\kappa$-$Al_2O_3$, $ZrO_2$, $HfO_2$ or AlN, preferably produced with CVD.

The electrically conductive material of the lead may, for example, include a metal, a carbide, boride, boron nitride or a carbonitride such as one or more of TiN, TiC, ZrC, ZrN, HfN, HfC, CrC, CrN, TiCN, ZrCN, $TiB_2$, TiBN, AlTiN, Au, Pt, Pd, Cu, Cr and Ni.

According to some embodiments, the method may include forming, prior to subjecting at least a portion of the body to the blasting, a second layer covering at least a portion of the body such that at least a portion of the second layer is provided in the recess and covers the electrically conductive material located in the recess.

The second layer may, for example, be electrically insulating.

The first layer may, for example, be more resistant to blasting than the second layer. During the blasting, a portion of the second layer located outside the recess may, for example, be removed while the at least a portion of the second layer provided in the recess prior to blasting may remain in the recess also after the blasting.

It is noted that embodiments of the present disclosure relate to all possible combinations of features recited in the claims. Further, it will be appreciated that the various embodiments described for the cutting insert, according to the first aspect, are all combinable with embodiments of the method according to the second aspect, and vice versa.

The foregoing summary, as well as the following detailed description of the embodiments, will be better understood when read in conjunction with the appended drawings. It should be understood that the embodiments depicted are not limited to the precise arrangements and instrumentalities shown.

Figure 1:
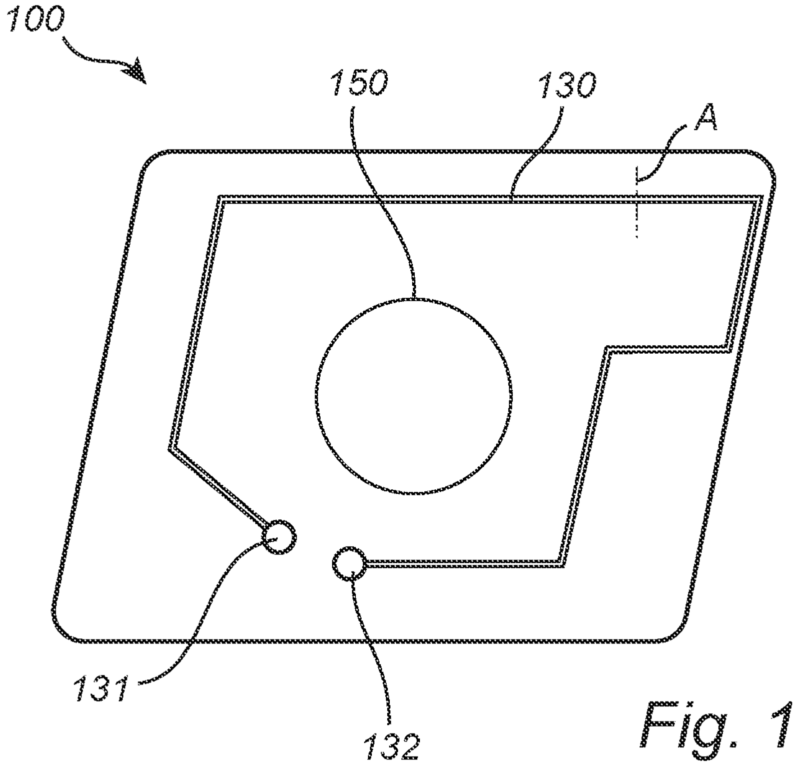
FIG. 1 is a top view of a cutting insert with a sensor arrangement, according to an embodiment.

All the figures are schematic, not necessarily to scale, and generally only show parts which are necessary in order to elucidate the respective embodiments, whereas other parts may be omitted or merely suggested. Unless otherwise indicated, like reference numerals refer to like parts in different figures.

DETAILED DESCRIPTION

Figure 2:
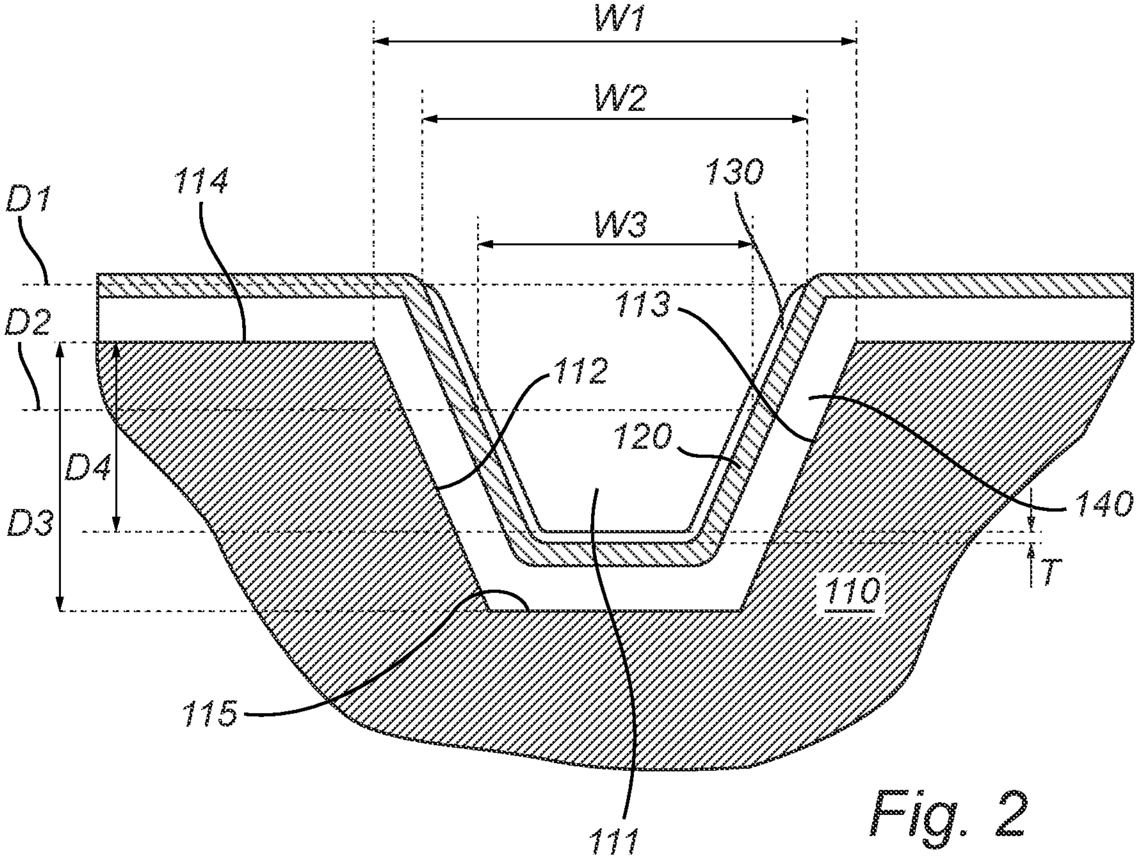
FIG. 2 is cross-sectional view of a portion of the cutting insert of FIG. 1, showing a recess in which, a lead of the sensor arrangement is arranged.

FIG. 1 is a top view of a cutting insert 100 with a sensor arrangement, according to an embodiment. FIG. 2 is cross-sectional view of a portion of the cutting insert 100 from FIG. 1, showing a recess 111 in which a lead 130 of the sensor arrangement is arranged. The cross section shown in FIG. 2 is taken along the line A in FIG. 1 in a direction orthogonal to the direction of the lead 130, and only includes a portion of the cutting insert 100. A perspective view of the cutting insert 100 is provided in FIG. 3 which also shows a portion of an example cutting tool in which the cutting insert 100 may be employed. The cutting insert 100 is adapted for use in machining operations such as cutting, milling or drilling of metal.

The cutting insert 100 includes a substrate 110 (or a base material 110) having an elongate recess 111 (or cavity 111) extending along at least a portion of the substrate 110. While the recess 111 is shown in the cross-sectional view of FIG. 2, it may not be that clearly visible when viewed from above or in a perspective view. For reasons of clarity, the recess 111 is therefore not shown in FIGS. 1 and 3.

Figure 3:
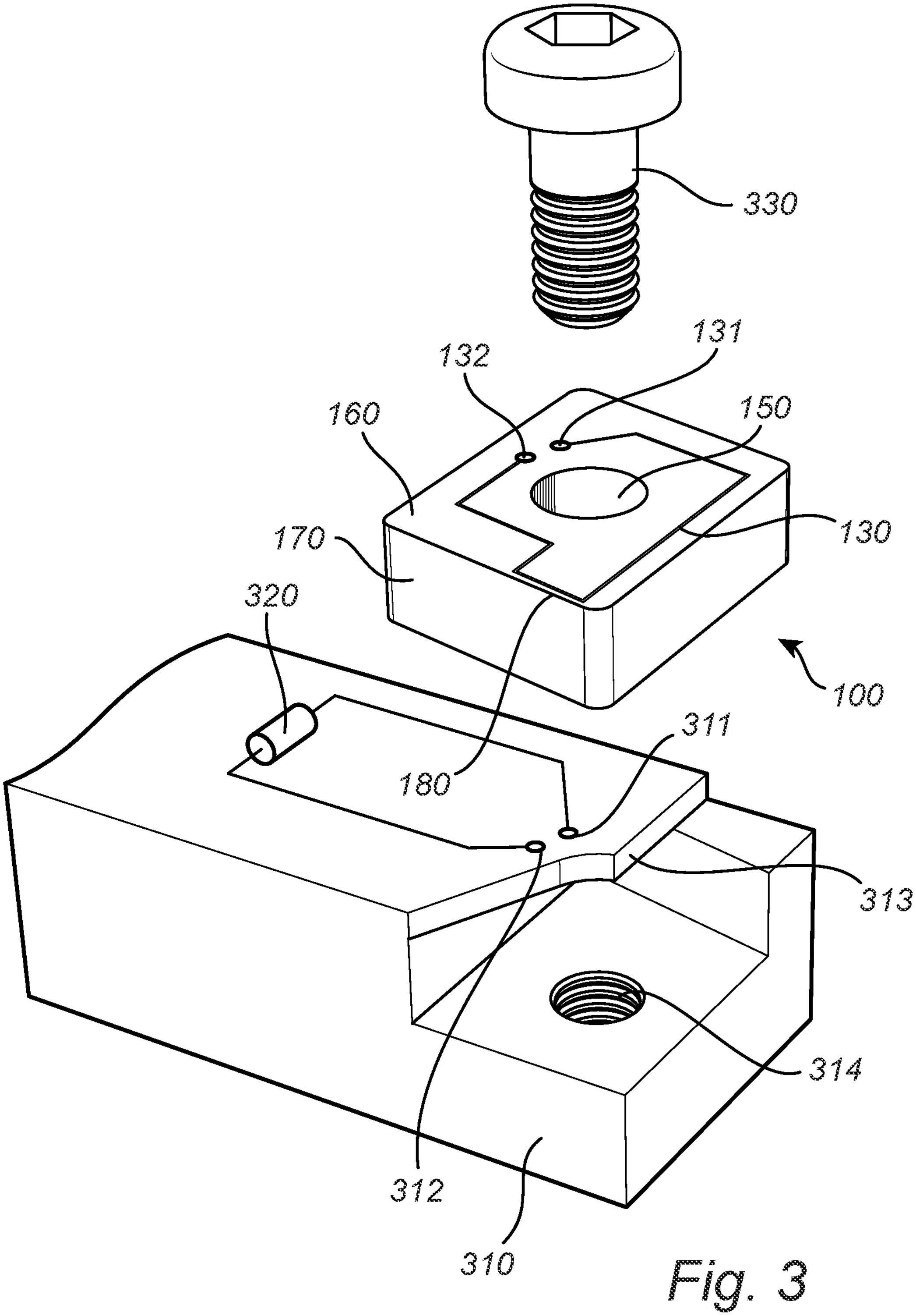
FIG. 3 is a perspective view of a portion of an example cutting tool in which the cutting insert from FIG. 1 may be employed.

On the other hand, FIGS. 1 and 3 show how the lead 130 (which is arranged in the recess 111 and follows the recess 111) extends along the cutting insert 100. The recess 111 may extend along the cutting insert 100 similarly to the lead 130 shown in FIGS. 1 and 3. The substrate 110 may, for example, be shaped as a parallelepiped, but with a hole 150 at the rake face 160. The substrate 110 may, for example, include (or be made of) cemented carbide, such as tungsten carbide with a cobalt binder.

The cutting insert 100 includes a first layer 120 covering at least a portion of the substrate 110, including interior side walls 112 and 113 of the recess 111. The first layer 120 is an electrically insulating layer and may, for example, include (or be made of) $\alpha$-$Al_2O_3$ (di-aluminum tri-oxide in the alpha phase). The first layer 120 may, for example, act as a thermal barrier. The first layer may further be a layer of high wear resistance in metal cutting operation. The thickness of the first layer 120 is in the range of 1-15 micrometers.

The cutting insert 100 includes a sensor arrangement including a lead 130 extending along the recess 111. The lead 130 includes electrically conductive material 130 which is arranged in the recess 111 such that the first layer 120 is located between the electrically conductive material 130 and the interior side walls 112 and 113 of the recess 111. The electrically conductive material 130 may, for example, include a suitable nitride and/or carbide such as TiN (titanium nitride), TiCN (titanium carbonitride) and/or TiC (titanium carbide). In the present embodiment, the lead 130 is provided in the form of an electrically conductive coating or layer arranged in the recess 111 over the first layer 120. The thickness T of the electrically conductive layer 130 is in the range of 0.1-5 micrometers.

In the present embodiment, there is an inner layer 140 located between the substrate 110 and the first layer 120. The inner layer 140 may, for example, include Ti(C, N, O), for example TiCN. Other compositions are also envisaged, such as compositions based on Zr(C,N), AlTiN or Hf(C,N). The thickness of the inner layer 140 is in the range of 1-15 micrometers. The inner layer 140 is advantageous in providing increased wear resistance, such as abrasive resistance of the cutting tool. The first layer 120 provides electrical insulation between the lead 130 and the inner layer 140 which may be electrically conductive.

Figure 4:
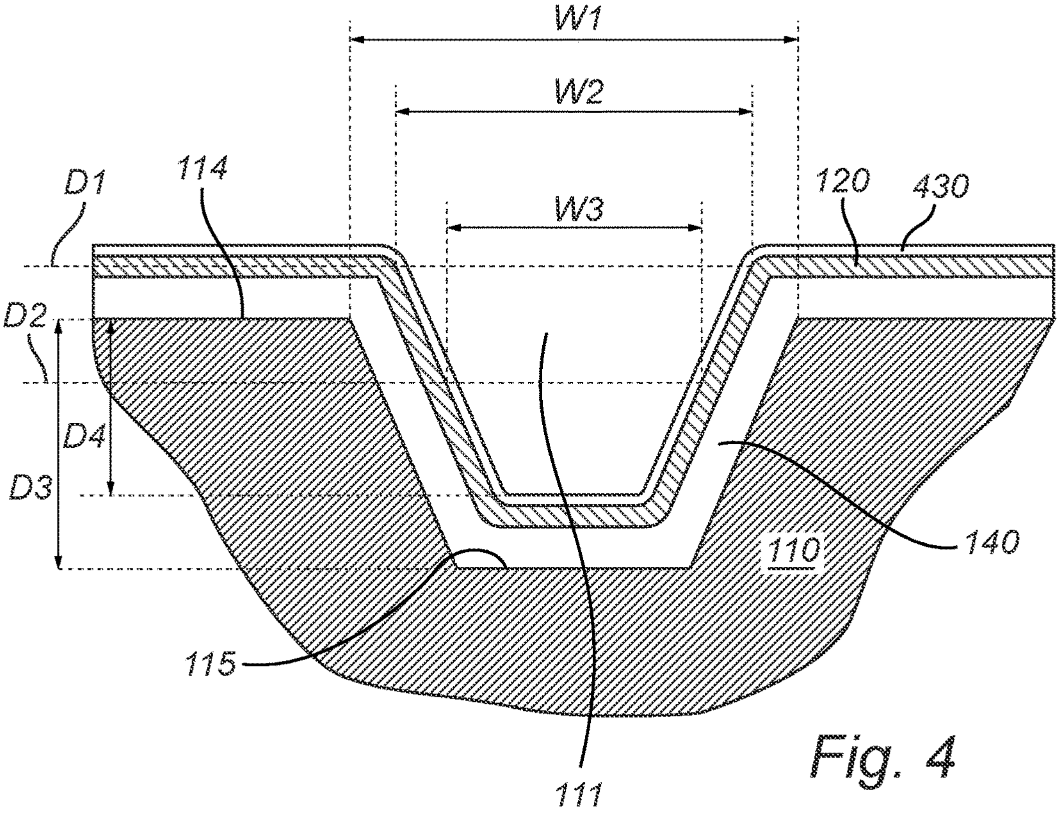
FIG. 4 is a cross-sectional view a portion of the cutting insert from FIGS. 1-3, but before being subjected to blasting.

The cutting insert 100 (as well as methods of manufacturing the cutting insert) will be further described below with reference to FIGS. 1, 2 and 4. However, a purpose of the sensor arrangement of the cutting insert 100 will first be described with reference to FIGS. 1-3.

The lead 130 is part of a sensor arrangement provided in the cutting insert 100. As shown in FIG. 1, the sensor arrangement also includes first and second contact regions 131 and 132 through which the sensor arrangement is connectable to external measuring circuitry. The lead 130 is connected to the first and second contact regions 131 and 132 so that a resistance of the lead 130 can be measured via the contact regions 131 and 132. Since the sensor arrangement forms a closed loop from the first contact region 131, through the lead 130, to the second contact region 131, the measured resistance may be quite low. However, if the cutting insert 100 is subjected to wear in a region were the lead 130 is arranged, the lead 130 may eventually get damaged or worn down (at least if it is not arranged too deep into a recess). During metal cutting, when the cutting insert 100 is interacting with a work piece, the work piece itself or a chip from the work piece may cause wear to the cutting insert 100 and may eventually reach down into the recess 111 to damage the lead 130.

While damage to the lead 130 may increase the resistance of the lead 130, this may not be that easy to detect when the cutting insert is cutting (also referred to as "in cut"). Indeed, the measured resistance could be low even if the lead 130 is damaged since the work piece (or a chip from the work piece) may be electrically conductive and may contribute to conveying electrical current past the damaged portion of the lead 130. However, when the cutting insert 100 is no longer cutting (also referred to as "out of cut"), damage to the lead 130 may be indicated (or manifested) by an increased resistance since the work piece or chip will no longer contribute to conveying electrical current. Hence, wear of the cutting insert 100 may be detected via detection of an increased resistance out of cut. When it is detected via the sensor arrangement that the cutting insert 100 has reached a certain level or wear, the cutting insert 100 may, for example, be replaced by a new cutting insert.

FIG. 3 is a perspective view of a portion of an example cutting tool in which the cutting insert 100 may be employed. The cutting tool includes a tool holder 310 for holding the cutting insert 100, and measuring circuitry 320 connected to the tool holder 310 for measuring the resistance of the lead 130. The tool holder 310 has electrical contacts 311 and 312 which are to be electrically connected to the contact regions 131 and 132, respectively, of the cutting insert 100 as the cutting insert 100 is held by the tool holder 310. In the present example, the electrical contacts 311 and 312 are exposed on a lower side of a projection 313 provided on the holder 310, such that they will be in contact with the contact regions 131 and 132 of the cutting insert 100 once the latter has been attached at the holder 310. The measuring circuitry 320 is connected to the sensor arrangement of the cutting insert 100 through the contacts 311 and 312 of the tool holder 310. The cutting insert 100 has a through hole 150 in the rake face 160 and there is provided a screw hole 314 in the holder 310, enabling fastening of the cutting insert 100 to the holder 310 by means of a screw 330.

The cutting insert 100 described above with reference to FIGS. 1-3 only has a single lead 130. However, embodiments may be envisaged in which the sensor arrangement of a cutting insert includes multiple leads. A cutting insert may, for example, include multiple leads and associated contact regions for performing measurements in different regions of a cutting insert, for example at different sides/faces of the cutting insert. A tool at which the cutting insert is mounted may include electrical contacts and measuring circuitry for measuring the electrical resistance of such multiple leads.

Figure 10:
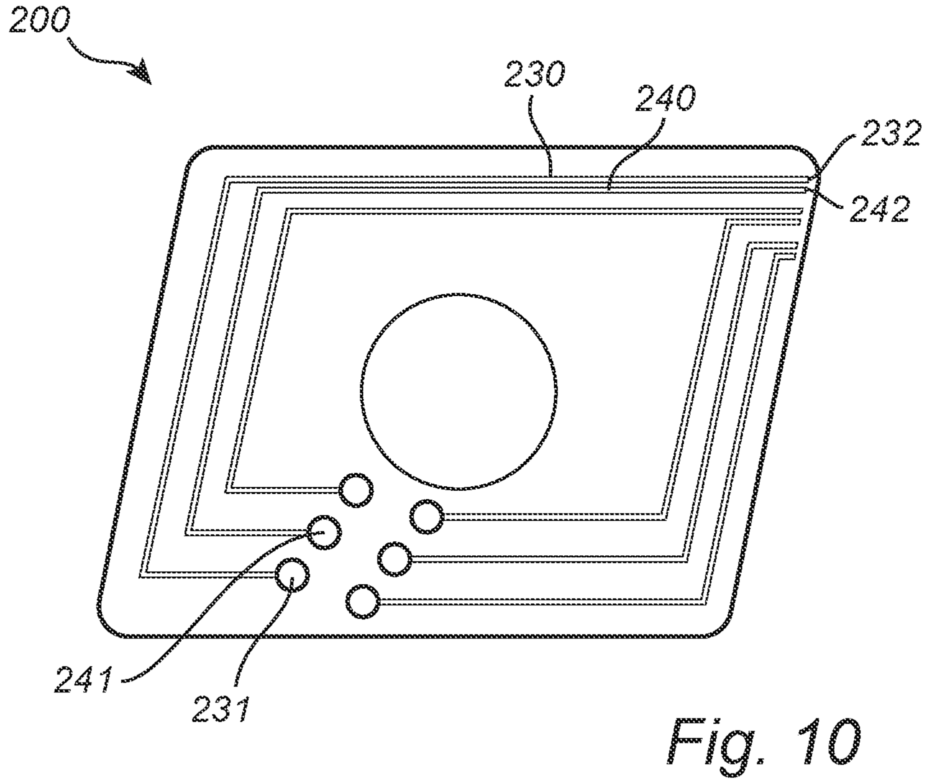
FIG. 10 is a top view of a cutting insert with a different sensor arrangement than the cutting insert in FIG. 1, according to an embodiment.

FIG. 10 is atop view of a cutting insert 200 with multiple leads, according to an embodiment. The leads of the cutting insert 200 are grouped into three pairs for monitoring wear at different locations. Only one of these pairs will be described, but the other pairs of leads are arranged analogously.

A first lead 230 is connected to a first contact region 231, and a second lead 240 is connected to a second contact region 241. The sensor arrangement is connectable to external measuring circuitry via the contact regions 231 and 241 in a similar way as for the cutting insert 100 and measuring circuitry 320 described above with reference to FIG. 3. The leads 230 and 240 may, for example, be arranged in respective recesses similar to the recess 111 described above with reference to FIG. 2. The leads 230 and 240 present free ends 232 and 242 positioned such that, upon a predetermined wear of the cutting insert 200, the free ends 232 and 242 will be connected to each other by a metal work piece or by a chip resulting from operation of the cutting insert 200 on the metal work piece. In other words, the leads 230 and 240 end at respective free ends 232 and 242 which are not connected to each other before the cutting insert 200 is sufficiently worn.

The external measuring circuitry measures the resistance between the contact regions 231 and 241. Initially, the free ends 232 and 242 will not be connected to each other so the measured resistance will be high (in other words, the sensor arrangement of the cutting insert 200 is an open loop sensor arrangement, in contrast to the closed loop sensor arrangement described above with reference to FIGS. 1 and 3). As the cutting insert 200 is subjected to wear, the free ends 232 and 242 of the leads 230 and 240 will eventually be exposed (unless the free ends 232 and 242 are arranged too deep into recesses) and be connected to each other by the work piece or a chip from the work piece. When this happens, the measured resistance decreases, which may be detected in cut (that is, during metal cutting). In other words, there is no need to wait until the cutting insert 200 is out of cut for detecting that the predetermined wear has been reached. When it is detected via the sensor arrangement that the cutting insert 200 has reached a certain level or wear, the cutting insert 200 may, for example, be replaced by a new cutting insert.

It will be appreciated that the sensor arrangement of a cutting insert may include leads of different types, and or positioned in different regions of the cutting insert. A combination of open loop sensor arrangements (as described with reference to FIG. 10) and closed loop sensor arrangements (as described with reference to FIG. 1) may, for example, be employed in a cutting insert. A sensor arrangement may, for example, be arranged to measure wear close to a cutting edge 180 of a cutting insert. Leads of the sensor arrangement may, for example, be arranged at a rake face 160 to monitor crater wear, or at a clearance face 170.

Having the leads arranged in recesses (instead of at the surface of the cutting insert) reduces the risk that the leads get damaged or fall off at an initial stage of machining. The leads may, for example, be arranged at a certain depth so that they only get affected by wear once the cutting insert has been subjected to a certain level of wear.

A method of manufacturing the cutting insert 100 described above with reference to FIGS. 1-3 will now be described with reference to FIGS. 1, 2 and 4. FIG. 4 is a cross-sectional view of the same portion of the cutting insert 100 as in FIG. 2, but before it has been subjected to blasting. The cutting insert 100 may, for example, be manufactured as follows.

First, the substrate 110 is provided, for example via a common production method such as sintering or hot isostatic pressing of metal powder. The substrate 110 may, for example, be shaped approximately as a parallelepiped (with a hole 150 in the center as shown in FIG. 1).

The elongate recess 111 in the substrate 110 may be formed during the sintering or pressing by using an appropriately shaped pressing tool. Alternatively, laser (such as a picosecond laser) could be employed to form the recess 111 after the substrate 110 has been produced. In the present embodiment, the recess 111 is tapered (or V-shaped) such that it is wider at the top than deeper down unto the recess 111. Embodiments may also be envisaged in which the recess 111 has different shapes, such as a recess with vertical side walls, or a U-shaped or semicircular recess with curved side walls. The shape of the recess 111 may, for example, depend on the method employed for providing the recess. The recess 111 may, for example, be at least 5, 10 or 20 micrometers deep. The depth of the recess 110 may, for example, be measured as a vertical distance D3 from a surface 114 of the substrate 110 in which the recess 111 is formed, down to a bottom 115 of the recess 111. The depth D3 of the recess 111 may, for example, be in the range 1-50 micrometers, preferably in the range 10-50 micrometers, or in the range 20-40 micrometers.

Layers (or coatings) are then applied to the substrate 110 using chemical vapor deposition (CVD) or some other method, such as physical vapor deposition (PVD). The first layer 120 is formed to cover the substrate 110, including the interior side walls 112 and 113 of the recess 111. A layer 430 of electrically conductive material is then formed to cover the substrate 110 such that electrically conductive material 430 is provided in the recess 111 with the first layer 120 being located between the electrically conductive material 430 in the recess 111 and the interior side walls 112 and 113 of the recess 111. In the present embodiment, an inner layer 140 is applied between the substrate 110 and the first layer 120. The inner layer 140, the first layer 120, and the electrically conductive layer 430 form a CVD stack covering the substrate 110.

A portion of the lead 130 may, for example, be arranged at a depth D4 of at least 5, 10 or 20 micrometers into the recess 111 measured from the surface 114 of the substrate 110 in which the recess 111 is formed.

The substrate 110 is then subjected to top blasting such that those parts of the electrically conductive material 430 located outside the recess 111 are removed from the substrate 110 while electrically conductive material 430 remaining in the recess 111 forms the lead 130 (as shown in FIG. 1) extending along the recess 111. For this blasting procedure to work as intended, the width of the recess 111 is selected appropriately with respect to the size of blasting particles to be employed during blasting.

The width of the recess 111 could be expressed in different ways. A first width W1 could for example be measured between the left side wall 112 of the recess 111 and the right side wall 113 of the recess 111. In the present embodiment, the recess 111 is tapered (or V-shaped) such that it is wider at the top than deeper down unto the recess 111. The first width W1 may therefore be measured at the top of the side walls 111 and 112 to obtain the largest possible width of the recess 111. The first width W1 may, for example, be less than or equal to 100 micrometers, or less than or equal to 90 micrometers, or less than or equal to 80 micrometers.

However, in the present disclosure, it is more useful to consider the width of the recess 111 as experienced by blasting particles employed during the blasting, since a sufficiently narrow recess 111 may protect the electrically conductive material 430 in the recess 111 from the blasting. The width is therefore measured between portions of the first layer 120 covering opposite interior side walls 112 and 113 of the recess 111. In other words, the width is measured from a portion of the first layer 120 covering the left side wall 112 of the recess 111 to a portion of the first layer 120 covering the right side wall 113 of the recess 111. The width may be measured at different depths of the recess 111. It is useful to measure the width at depths below which there is electrically conductive material 430 in the recess 111, so that such electrically conductive material 430 may be protected if the width is small enough.

In the present embodiment, a width (henceforth referred to as the second width W2) may, for example, be measured at a depth D1 corresponding to the uppermost part of the recess 111. If the second width W2 is small enough compared to the size of the blasting particles, this allows more or less all the electrically conductive material 430 in the recess 111 to be protected by the recess 111 during blasting, which results in a lead 130 extending all the way up to the top of the recess, as shown in FIG. 1. Such a result may, for example, be obtained if the blasting particles have an average diameter above 80 micrometers, and the second width W2 is at most 80 micrometers, preferably less than 70 micrometers. The average diameter of the blasting particles may, for example, be 70 micrometers, and the second width W2 of the recess 111 may, for example, be 60 micrometers, or 50 micrometers. It will be appreciated that, as long as the first layer 120 and/or the inner layer 140 are/is sufficiently thick, the first width W1 could still be larger than the average diameter of the blasting particles.

Figure 5:
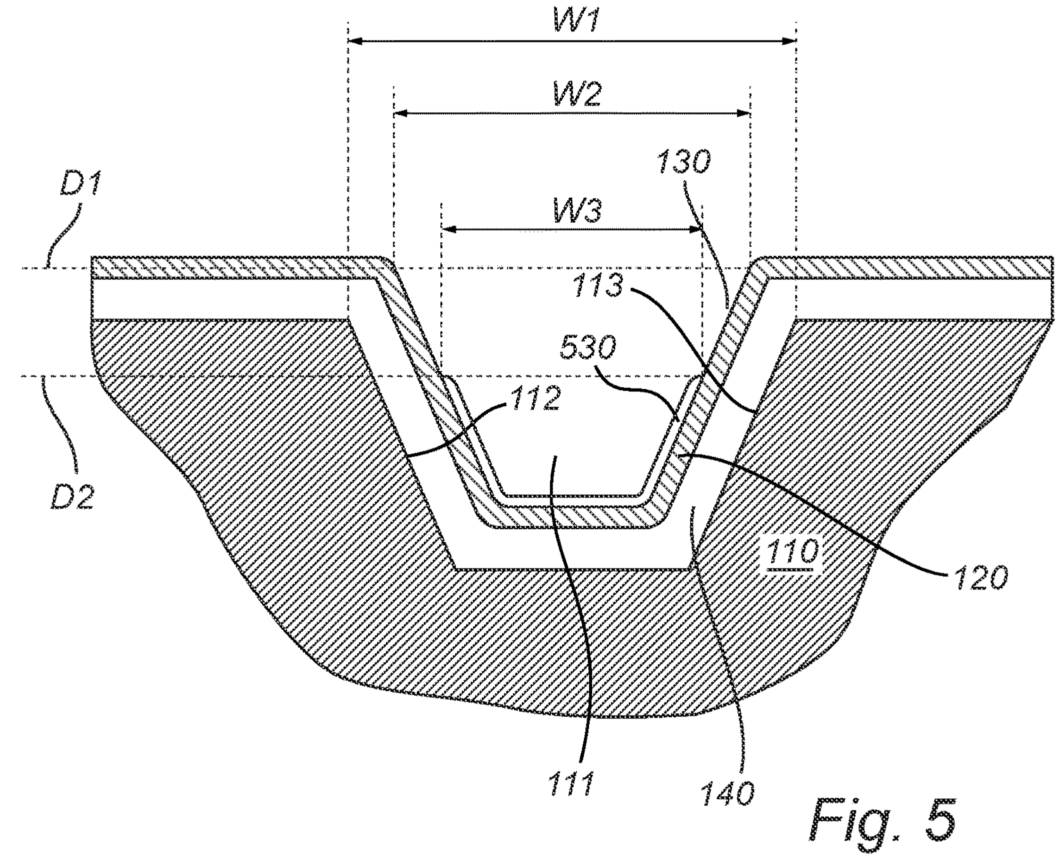
FIG. 5 is a cross-sectional view of a portion of a cutting insert where the lead is located further down into the recess compared to the cutting insert in FIG. 2, according to an embodiment.

If the second width W2 is too large compared to the size of the blasting particles (for example, the second width W2 is 100 micrometers but the average diameter of the blasting articles is 70 micrometers), then some of the electrically conductive material 430 located in the recess 100 may be removed during the blasting. A width (henceforth referred to as the third width W3) may then be measured deeper down in the recess 111 (for example, at a depth D2 halfway down into the recess 111) where the recess 111 is more narrow. If the third width W3 is small enough compared to the size of the blasting particles (for example, the third width W3 may be smaller than the average diameter of the blasting particles), this allows the electrically conductive material 430 located below that depth D2 in the recess 111 to be protected by the recess 111 during blasting, which results in a lead 530 located in the recess 111 and extending up to that depth D2 where the third width W3 is measured, as shown in FIG. 5. In other words, the lead 530 does not extend all the way up to the top of the recess 111. This may, for example, reduce the risk that the lead 530 gets into unintentional electrical contact with the work piece, chips from the work piece, or debris created during machining, which could affect the reliability of measurements performed via the lead 530.

During the blasting, the substrate 110, as well as those of its layers which are exposed, are bombarded by particles. The first layer 120 is adapted to withstand the blasting, so the blasting particles do not reach the conductive material 430 located inside the recess 111 as long as the recess 111 is sufficiently narrow compared to the size of the blasting particles. The blasting is employed to provide a desired surface smoothness of the first layer 120 and to enable a tougher edge line performance due to the resulting residual compressive stress in the first layer 120 as a result of the blasting. Hence, the cutting insert 100 remaining after the blasting has a lead 130 (or 530) which may be employed for measurements, and a first layer 120 outside the recess 111 which provides the desired machining performance for the cutting insert 100.

The size of the blasting particles should not be too large, since that would involve too high kinetic energy, which may, for example, risk damaging a cutting edge of the cutting insert. The average diameter of the blasting particles may, for example, be at most twice as large as the radius of a cutting edge of the cutting insert. The radius of the cutting edge may, for example, be in the range 25-50 micrometers. Still, the recess 111 should be sufficiently narrow compared to the blasting particles so that at least some electrically conductive material 430 in the recess 111 may be protected from the blasting particles during the blasting.

The manufacturing method described above with respect to FIGS. 1, 2 and 4 is an efficient way to provide a cutting insert 100 with a sensor arrangement. If the recess 111 is formed via use of an appropriately shaped pressing tool (rather than using laser to form the recess 111), the sensor arrangement may, for example, be provided as part of ordinary manufacturing steps employed for manufacturing CVD coated cutting inserts without sensor arrangements. In other words, there may be no need to use dedicated manufacturing steps (for example including etching or laser) for introducing the sensor arrangement in the cutting insert.

If top blasting is employed to remove electrically conductive material 430 located outside the recess 111 at a rake face of the cutting insert 100, then electrically conductive material may remain at other faces/sides of the cutting insert (such as a clearance face) after the top blasting. If a too thick layer of electrically conductive material 430 remains at the clearance face of the cutting insert after the top blasting, then this layer may affect performance of the cutting insert.

It should be appreciated that the lead 130 may, for example, extend its entire length in a recess 111. However, embodiments may also be envisaged in which some portions of the lead 130 (for example located far away from regions where wear is expected) may be provided at the surface of the cutting insert 100 rather than in a recess 111. It will be appreciated that a cutting insert may include leads arranged in recesses as well as leads arranged at the surface of the cutting insert. It will also be appreciated that different portions of the lead 130 may, for example, be arranged at different depths into the recess 111, and that the width of the recess 111 may vary along the extension of the recess 111. The substrate 110 may, for example, have a certain surface geometry (for example including ridges and valleys) to improve cutting performance and/or durability, which may cause the depth of the recess 111 to vary along the cutting insert 100. Different portions of the lead 130 may also have different shapes, thicknesses or diameters. The lead 130 is preferably sufficient thick (for example a thickness T of at least 0.5 micrometers) not to break too easily during manufacture.

It should be appreciated that in the cross-section depicted in FIG. 2, the lead 130 has a diameter which is at least as large as the second width W2 of the recess 111. It will also be appreciated that in the cross-section depicted in FIG. 5, the lead 530 has a diameter which is at least as large as the third width W3 of the recess 111.

Figure 6:
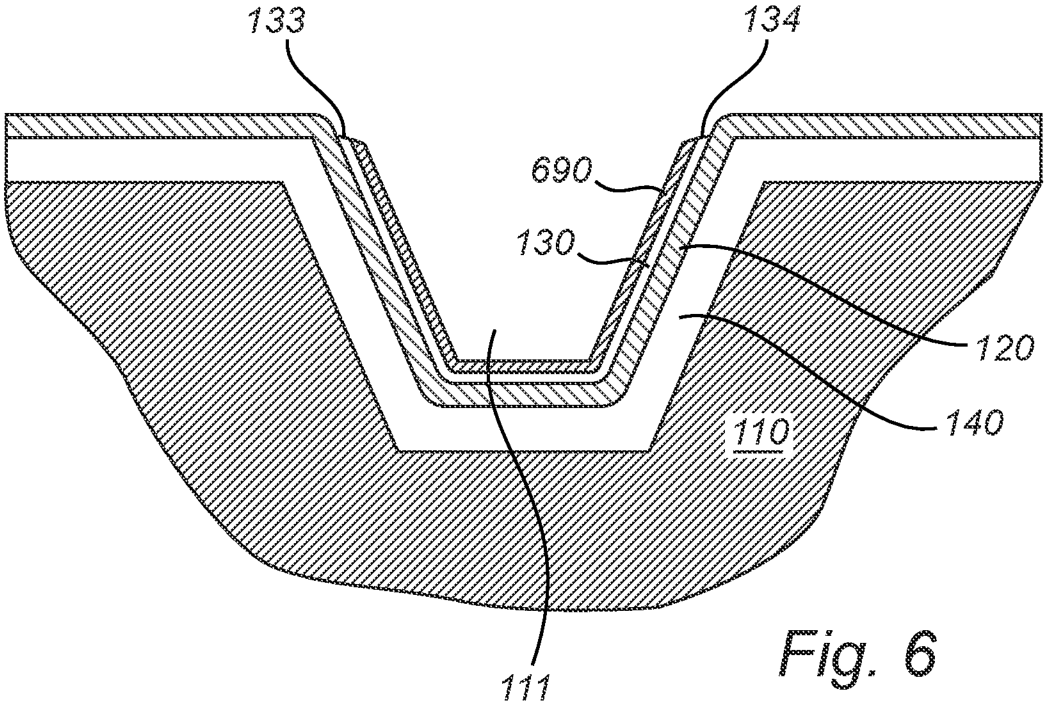
FIG. 6 is a cross-sectional view of a portion of a cutting insert with an extra insulating layer compared to the cutting insert in FIG. 2, according to an embodiment.
Figure 7:
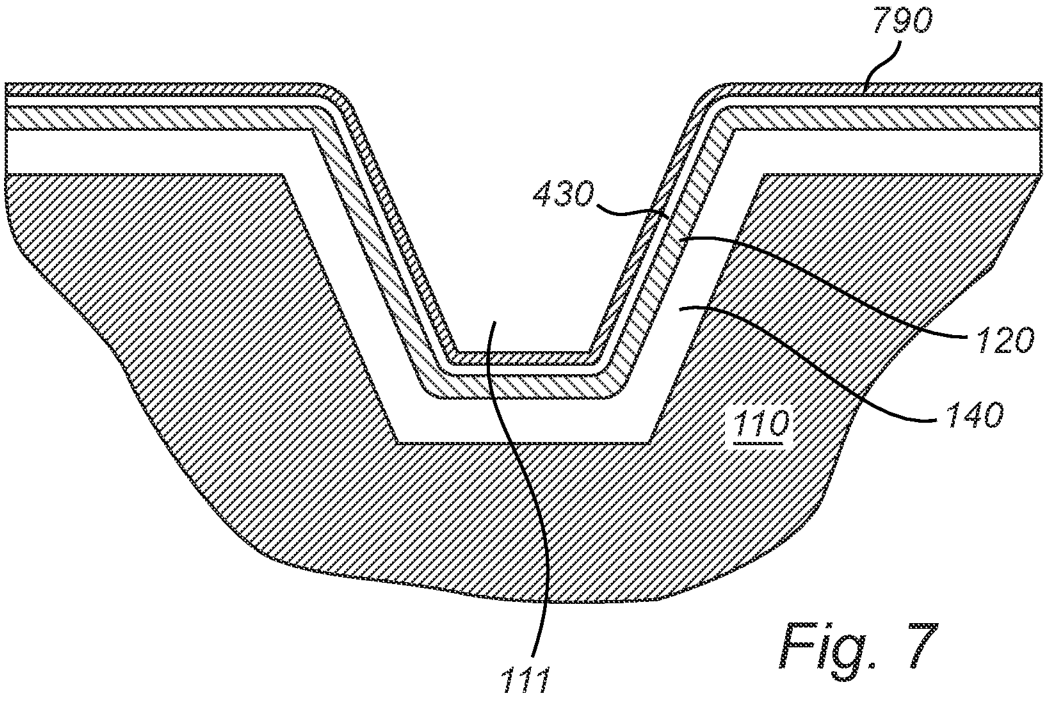
FIG. 7 is a cross-sectional view of a portion of the cutting insert from FIG. 6, but before being subjected to blasting.

FIG. 6 is a cross-sectional view of a portion of a cutting insert with an extra insulating layer 690 compared to the cutting insert 100 in FIG. 2, according to an embodiment. The extra insulating layer 690 may, for example, include κ-$Al_2O_3$ (di-aluminum tri-oxide in the kappa phase) and provides electrical insulation for the lead 130. The cutting insert in FIG. 6 is manufactured in a similar way as the cutting insert 100 described with reference to FIGS. 1-4, except that a second layer 790 is formed before the blasting, as illustrated in FIG. 7 (which is a cross-sectional view of a portion of the cutting insert from FIG. 6, but before being subjected to blasting). Before the substrate 110 is subjected to blasting, the second layer 790 is formed such that it covers the substrate 110. At least a portion of the second layer 790 is provided in the recess 111 and covers the electrically conductive material 430 located in the recess 111. When the blasting is performed, those parts of the second layer 790 located outside the recess 111 are removed, while those parts of the second layer 790 located in the recess 111 remain to form the extra insulating layer 690 (as illustrated in FIG. 6).

The extra insulating layer 690 reduces the risk that the lead 130 gets into unintentional electrical contact with the work piece, chips from the work piece, or debris created during machining, which could otherwise affect the reliability of measurements performed via the lead 130. In the present example, all but the upper ends 133 and 134 of the lead 130 are insulated by the extra insulating layer 690. The insulating layer 690 also protects the lead 130 from oxidation, which could affect the resistance of the lead 130.

Figure 8:
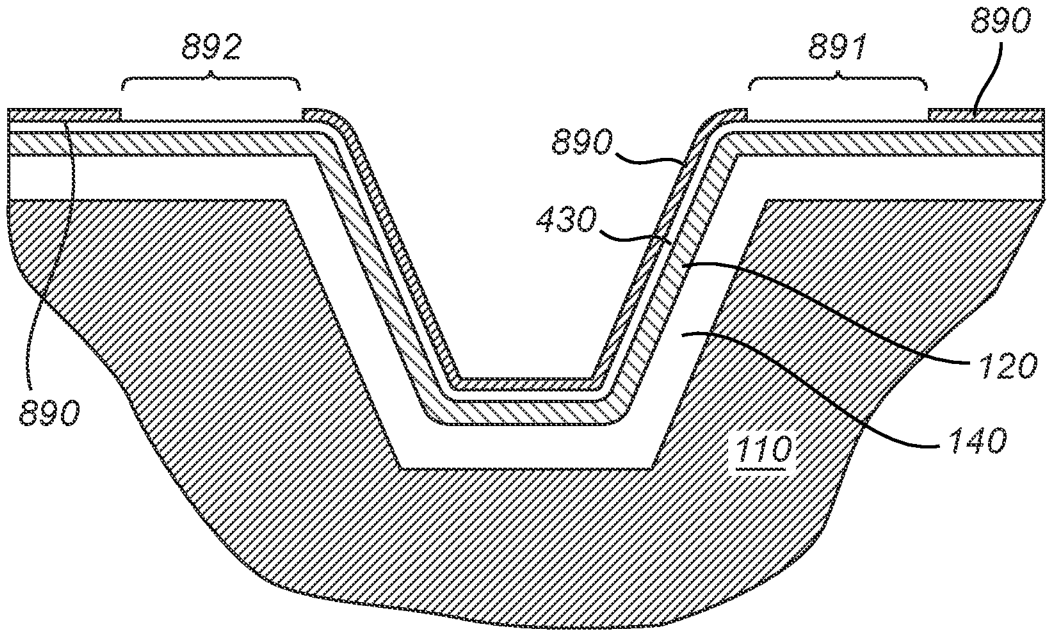
FIG. 8 is a cross-sectional view of a portion of a cutting insert with an extra insulating layer similarly to the cutting insert in FIG. 7, but where certain portions of the extra insulating layer have been removed, according to an embodiment.
Figure 9:
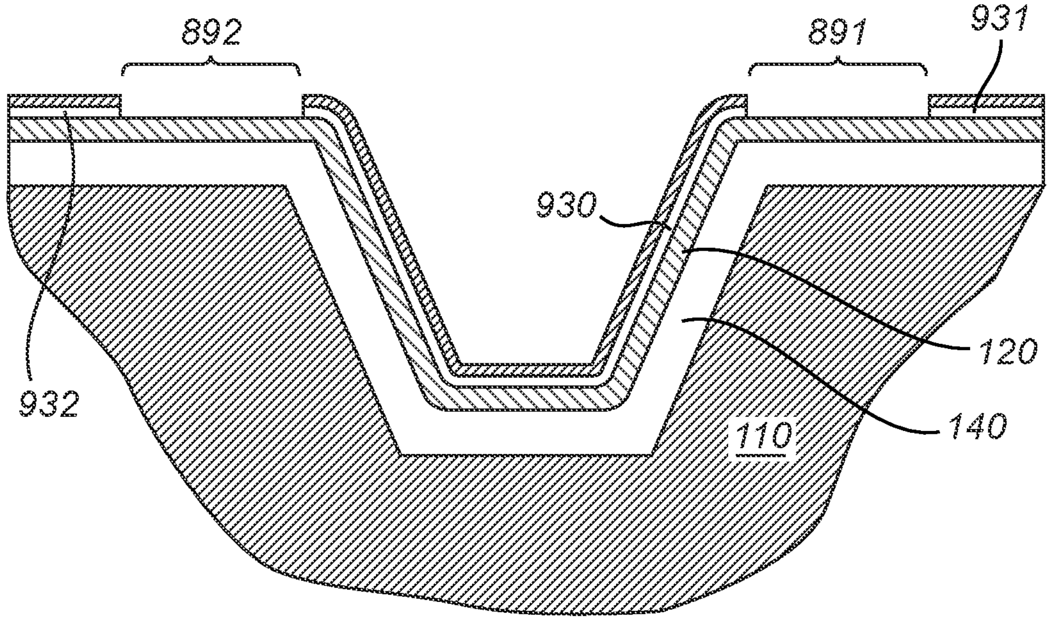
FIG. 9 is a cross-sectional view of a portion of the cutting insert from FIG. 8, but after being subjected to blasting.

FIG. 8 is a cross-sectional view of a portion of a cutting insert with a second layer 890 similar to the second layer 790 in FIG. 7, but where certain portions 891 and 892 of the second layer 890 have been removed, according to an embodiment. FIG. 9 is a cross-sectional view of a portion of the cutting insert from FIG. 8, but after being subjected to blasting.

In the present embodiment, the second layer 890 (which is an extra insulating layer) is of a type which is resistant to blasting (that is, which is not removed via blasting). The extra insulating layer 890 may, for example, include α-$Al_2O_3$ (di-aluminum tri-oxide in the alpha phase). Since the extra layer 890 protects the conductive layer 430, laser or etching is employed to remove portions 891 and 892 of the extra layer 890 on either side of the recess 111 prior to blasting. This allows conductive material 430 located below these removed portions 891 and 892 to be removed during blasting, so that a lead 930 is formed in the recess 111. In the present embodiment, electrically conductive material 931 and 932 remains on either side of the recess 111, but is not connected to the lead 930 in the recess 111.

An advantage of manufacturing cutting inserts according to the embodiment described above with reference to FIGS. 6 and 7 is that it does not require use of etching or laser for forming the lead 130 (in contrast to the embodiment described with reference to FIGS. 8 and 9). Instead, all the layers may be provided in a CVD stack, and the lead 130 may be formed via the same blasting operation that is employed for improving cutting performance of the first layer 120.

Figure 11:
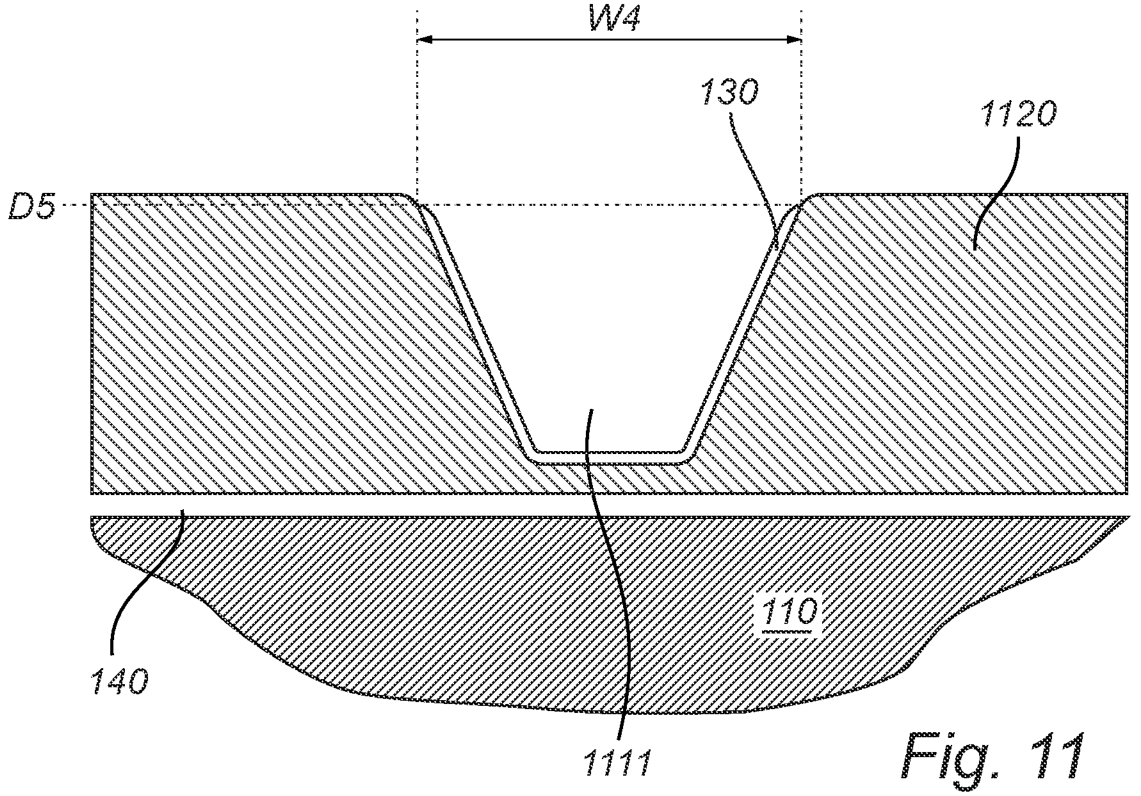
FIG. 11 is a cross-sectional view of a portion of a cutting insert similar to the cutting insert in FIG. 2, but where the recess is formed in a layer instead of in the substrate, according to an embodiment.

In the cutting insert 100, described above with reference to FIGS. 1-4, the recess 111 is formed in the substrate 110. However, embodiments may also be envisaged in which the recess 111 is formed in a layer covering the substrate 110 rather than in the substrate 110 itself. The recess 111 could for example be formed in the first layer 120 or in the inner layer 140. FIG. 11 is a cross-sectional view of a portion of a cutting insert in accordance with such an embodiment. In contrast to FIG. 2 where the lead 130 extends in a recess 111 formed in a substrate 110, the lead 130 in FIG. 11 extends in a recess 1111 formed in the first layer 1120 (which is electrically insulating, and which may be of the same material as the first layer 120 described above with reference to FIG. 2). In FIG. 11, the substrate 110, the inner layer 140, and the first layer 1120 may together be regarded as a body along which the recess 1111 extends. Since the recess 1111 is formed in the first layer 1120, the first layer 1120 covers the interior side walls of the recess 1111. The first layer 1120 is located between the lead 130 and the substrate 110 (and also between the lead 130 and the inner layer 140). The recess 1111 may, for example, be formed in the first layer 1120 via use of a laser.

Similarly, as for FIG. 2, a width W4 of the recess 1111 may be measured at a depth D5 close to the top of the recess 1111 such that the lead 130 is located below that depth D5. The width W4 is measured between portions of the first layer 1120 covering opposite side walls of the recess 1111, and may, for example, be less than or equal to 80 micrometers. The person skilled in the art realizes that the present invention is by no means limited to the example embodiments described above. On the contrary, many modifications and variations are possible within the scope of the appended claims. For example, recesses and leads of a cutting insert may extend along differently shaped paths/patterns than those example path/patterns shown in FIGS. 1 and 10.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A cutting insert for turning, milling or drilling of metal, the cutting insert comprising:

a body having an elongate recess extending along at least a portion of the body, wherein the body includes a substrate, wherein the recess comprises opposing interior sidewalls and a bottom surface therebetween;

a first layer covering the opposing interior side walls of the recess; and a sensor arrangement including at least one lead extending along the recess, the lead comprising electrically conductive material arranged in the recess such that the first layer is located between the electrically conductive material and the substrate, wherein the lead includes an electrically conductive layer covering at least portions of the opposing interior side walls of the recess, wherein a thickness of the electrically conductive layer is at most 4 micrometers, wherein for at least one depth measured from a surface of the body in which the recess is formed, below which at least a portion of the electrically conductive material is arranged in the recess, a width of the recess measured at the depth between portions of the first layer covering the opposing interior side walls of the recess, is less than or equal to 80 micrometers, wherein the recess is no more than 50 micrometers deep, and wherein at least a portion of the lead is arranged at a lead depth of the recess such that there is an empty space within the recess above the lead.

2. The cutting insert of claim 1, wherein the recess is formed in the substrate.

3. The cutting insert of claim 1, wherein the recess is no more than 40 micrometers deep.

4. The cutting insert of claim 1, wherein, for each depth at which at least a portion of the electrically conductive material is arranged in the recess, the width of the recess measured at the depth between portions of the first layer covering the opposing interior side walls of the recess is less than or equal to 80 micrometers.

5. The cutting insert of claim 1, wherein the width is less than or equal to 75 micrometers.

6. The cutting insert of claim 1, wherein the first layer is an electrically insulating layer.

7. The cutting insert of claim 1, further comprising a second layer arranged in the recess such that the lead is located between the first layer and the second layer, wherein the second layer is an electrically insulating layer.

8. The cutting insert of claim 6, wherein the first layer is more resistant to blasting than the second layer.

9. The cutting insert of claim 1, wherein at least a portion of the lead is arranged at a depth of at least 5 micrometers into the recess.

10. The cutting insert of claim 1, wherein a cross section of the lead has a width of at least 5 micrometers.

11. The cutting insert of claim 1, wherein the sensor arrangement includes first and second contact regions through which the sensor arrangement is connectable to external measuring circuitry, wherein the lead is connected to the first and second contact regions.

* * * * *